(12) United States Patent
Hennecke et al.

(10) Patent No.: US 9,455,609 B2
(45) Date of Patent: Sep. 27, 2016

(54) ELECTRIC MOTOR WITH A POWER OUTPUT STAGE AND WITH EFFICIENT HEAT TRANSPORT AND METHOD

(75) Inventors: Thomas Hennecke, Leinfelden (DE); Michael Heim, Holzgerlingen (DE); Hans Irion, Herrenberg (DE); Gerhard Braun, Rottenburg (DE); Frank Wehrmann, Reutlingen (DE); Georg Voegele, Langenargen (DE); Sigmund Braun, Kusterdingen (DE); Johannes Hirschle, Mehrstetten (DE); Alexander Fink, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 124 days.

(21) Appl. No.: 13/824,451

(22) PCT Filed: Sep. 7, 2011

(86) PCT No.: PCT/EP2011/065481
§ 371 (c)(1),
(2), (4) Date: Mar. 26, 2013

(87) PCT Pub. No.: WO2012/034912
PCT Pub. Date: Mar. 22, 2012

(65) Prior Publication Data
US 2013/0187490 A1 Jul. 25, 2013

(30) Foreign Application Priority Data
Sep. 16, 2010 (DE) .................. 10 2010 040 875

(51) Int. Cl.
| H02K 5/18 | (2006.01) |
| H02K 9/22 | (2006.01) |
| H02K 5/04 | (2006.01) |

(52) U.S. Cl.
CPC ........ *H02K 9/22* (2013.01); *H02K 5/18* (2013.01); *H02K 11/33* (2016.01); *H02K 5/04* (2013.01)

(58) Field of Classification Search
CPC ...... H02K 5/18; H02K 9/22; H02K 11/0073; H02K 5/04

USPC ............................................ 310/52–64, 89
IPC ................................................ H02K 5/04,9/22
See application file for complete search history.

(56) References Cited

U.S. PATENT DOCUMENTS 4,963,778 A * 10/1990 Jensen et al. ............... 310/68 D
5,334,897 A * 8/1994 Ineson ..................... H02K 5/08
310/401

(Continued)

FOREIGN PATENT DOCUMENTS

| DE | 10239557 | 3/2004 |
| DE | 102010017522 | 2/2011 |

(Continued)

OTHER PUBLICATIONS

International Search Report for Application No. PCT/EP2011/065481 dated Apr. 4, 2012 (2 pages).

*Primary Examiner* — Dang Le
(74) *Attorney, Agent, or Firm* — Michael Best & Friedrich LLP

(57) ABSTRACT

The invention relates to an electric motor, in particular an electronically commutated electric motor. The electric motor has a stator, a rotor and a housing, which accommodates at least the stator and the rotor in a cavity. The electric motor also has a power output stage, which is connected to the stator and is designed to energize the stator in order to induce a rotating magnetic field. The power output stage has at least one power semiconductor with a thermal contact area, wherein the thermal contact area is thermally conductively connected to the housing, with the result that heat generated in the power semiconductor can be dissipated to the housing. According to the invention, the housing has a housing cup, which at least partially surrounds the cavity and is preferably thermally conductive and which has a cup wall, wherein the cup wall has a mating contact area corresponding to the thermal contact area.

19 Claims, 3 Drawing Sheets

(56) References Cited

U.S. PATENT DOCUMENTS

| | | | |
|---|---|---|---|
| 5,732,790 A | 3/1998 | Endo et al. | |
| 5,939,807 A * | 8/1999 | Patyk et al. | 310/89 |
| 6,031,306 A * | 2/2000 | Permuy | H02K 11/0073 310/60 A |
| 6,175,171 B1 * | 1/2001 | Rupp et al. | 310/52 |
| 2003/0127921 A1 | 7/2003 | Akutsu et al. | |
| 2004/0145259 A1 * | 7/2004 | Wysk | H02K 5/10 310/89 |
| 2009/0251030 A1 | 10/2009 | Fujimoto et al. | |
| 2010/0101889 A1 | 4/2010 | Yamaguchi et al. | |
| 2010/0327677 A1 | 12/2010 | Iwai et al. | |

FOREIGN PATENT DOCUMENTS

| | | |
|---|---|---|
| JP | H0288464 | 7/1990 |
| JP | H0421155 | 2/1992 |
| JP | H04161037 | 6/1992 |
| JP | H04168954 | 6/1992 |
| JP | H05103451 | 4/1993 |
| JP | H0729894 | 1/1995 |
| JP | H08181471 | 7/1996 |
| JP | 9030434 | 2/1997 |
| JP | H10271789 | 10/1998 |
| JP | 10322973 | 12/1998 |
| JP | 2000209810 | 7/2000 |
| JP | 2003212134 | 7/2003 |
| JP | 2005311239 | 11/2005 |
| JP | 2008118770 | 5/2008 |
| JP | 2008128076 | 6/2008 |
| WO | 20091125506 | 10/2009 |
| WO | 20101150527 | 12/2010 |

* cited by examiner

ELECTRIC MOTOR WITH A POWER OUTPUT STAGE AND WITH EFFICIENT HEAT TRANSPORT AND METHOD

BACKGROUND OF THE INVENTION

The invention relates to an electric motor, in particular an electronically commutated electric motor. The electric motor has a stator which preferably comprises stator coils. The electric motor also has a rotor and a housing which accommodates at least the stator and the rotor in a hollow space. The electric motor also has a power output stage which is connected to the stator and is designed to supply power to the stator in order to generate a rotating magnetic field. The power output stage has at least one power semiconductor with a thermal contact area, wherein the thermal contact area is connected to the housing so as to conduct heat, with the result that heat which is generated in the power semiconductor can be dissipated to the housing.

Electric motors which are known from the prior art, in particular electronically commutated electric motors with a permanent-magnet rotor, exhibit the problem that power semiconductors, as a constituent part of the power output stage for driving the stator, generate heat which has to be dissipated so that the power semiconductor does not overheat. The power semiconductors are connected, for example by way of their connections, to a printed circuit board and heat can be introduced into said printed circuit board by the power semiconductor.

SUMMARY OF THE INVENTION

According to the invention, the housing has a—preferably thermally conductive—housing cup which at least partially surrounds the hollow space and has a cup wall, with the cup wall having a mating contact area which corresponds to the thermal contact area. Therefore, the heat which is generated in the power semiconductor can advantageously be dissipated to the housing, in particular to the housing cup. In order to assemble the electric motor, the power output stage, in particular the power semiconductor, can further advantageously be thermally conductively connected first to the housing, before a further housing part, for example at least one cover for closing the cup, is connected to the housing cup. The cup can, for example, have a cup base which is integrally formed on the cup wall—or is connected to the cup wall in a detachable manner. The cup wall preferably extends parallel to the motor shaft axis. The cup wall is further preferably of hollow-cylindrical design.

A printed circuit board can further advantageously be plug-mounted on the power semiconductor, in particular on connection legs of the power semiconductor, wherein the connections of the power semiconductors can be soldered to the printed circuit board in a further manufacturing step. The unit which is completely assembled in this way allows for a housing cover which closes the housing to be screwed or plug-mounted in a simple manner. A controller comprising the power output stage can therefore advantageously be integrated in the motor housing in a space-saving manner. Intermediate circuit capacitors can further advantageously be mounted on the printed circuit board since the power output stage can be spaced apart from the printed circuit board and therefore not occupy a surface region of a printed circuit board surface of the printed circuit board.

In a preferred embodiment, the power output stage has three transistor half-bridges, wherein each transistor half-bridge forms at least one or only one power semiconductor, in particular power semiconductor module. The electric motor preferably has three power semiconductor modules. The power semiconductor modules, in particular the half-bridges, can therefore form, for example, a B6 bridge. The power semiconductor module can, for example, be in the form of a mold module in which transistors of the transistor half-bridge are incorporated in a housing of the mold module by means of an encapsulation compound, in particular a resin. The mold module preferably has a surface region of the surface of the mold module, which surface region is thermally conductively connected to the thermal contact area, or forms said thermal contact area, and via which surface region heat can be dissipated to the housing of the electric motor. The surface region can, for example, be formed by a thermally conductive stamped grid, in particular a copper stamped grid. The encapsulation compound is, for example, a thermoset.

In a preferred embodiment, the power semiconductor is connected, in particular by way of connections of the power semiconductor, to a printed circuit board which is arranged in the hollow space. The printed circuit board has a printed circuit board plane which preferably extends transverse to a motor shaft longitudinal axis of the electric motor.

The power semiconductor is preferably arranged in such a way that the thermal contact area makes operative contact with the mating contact area along the motor shaft longitudinal axis when the power semiconductor is joined to the housing, in particular to the housing cup. On account of the operative contact, heat can be effectively transmitted from the power semiconductor to the housing, in particular the housing cup.

In a preferred embodiment, the thermal contact area is convexly curved, and the mating contact area is concavely curved so as to correspond to the thermal contact area. In the case of the thermal contact area being convexly curved, the housing cup can be formed, for example, in a cylindrical manner. The mating contact area preferably exhibits the concave curvature in a section transverse to the motor shaft longitudinal axis.

In another embodiment, the thermal contact area and the mating contact area are each flat. In the case of the flat mating contact area, the housing part, which is formed by the housing cup, can advantageously be formed by a cast part, in particular a cast aluminum part. Therefore, the housing cup can, for example, be flat in the region of the mating contact area and be of cylindrical design outside the mating contact area along a rotor circumferential direction.

The electric motor preferably has a predetermined number of stator coils, and the housing cup wall has the predetermined number of mating contact areas in the rotor circumferential direction. Therefore, the housing for each half-bridge of the power output stage can have a mating contact area. The predetermined number is, for example, three.

The mating contact areas are preferably arranged in such a way that a power semiconductor, in particular a transistor half-bridge, is arranged between stator coils which are adjacent to one another in the rotor circumferential direction. Therefore, the power output stage, in particular the transistor half-bridge, can advantageously be accommodated in the motor housing in a particularly space-saving manner.

In a preferred embodiment, the housing, in particular the housing cup, has a guide element in the region of the mating contact area. The guide element is designed to guide the power semiconductor when it is joined to the housing cup and to establish the operative contact in the direction of the housing.

The operative contact for transmitting heat from the power semiconductor to the housing can advantageously be established in a particularly efficient manner as a result.

In a preferred embodiment, the guide element is designed to press the power semiconductor against the mating contact area during assembly and thereby to generate the operative contact.

The power semiconductor does not, for example, need to be screwed to the housing, in particular to the housing cup, as a result.

The housing preferably has a housing shaft, which forms the guide element and is designed to accommodate the power semiconductor, in the region of the mating contact area.

The housing preferably has a spring, in particular a leaf sprig, which is arranged in the shaft and which is designed to press the power semiconductor against the mating contact area after it has been inserted into the shaft.

In a preferred embodiment, the power semiconductor is spaced apart from the printed circuit board in such a way that, during operation of the electric motor, more heat is dissipated via the mating contact area than is introduced into the printed circuit board, for example by radiation or heat flow. Unnecessary heating of the printed circuit board can advantageously be avoided as a result. This is achieved primarily by physical separation of the power semiconductor from the printed circuit board in as much as the power semiconductor is connected to the housing, in particular to the housing cup. The printed circuit board is preferably arranged with a printed circuit board plane transverse to a motor shaft longitudinal axis, with the result that preferably only electrical connection legs of the power semiconductor are connected to the printed circuit board. A plane of the thermal contact area preferably runs perpendicular to the printed circuit board plane.

The invention also relates to a method for connecting an electronics assembly of an electric motor to a housing of the electric motor. The electronics assembly of the electric motor has at least one power semiconductor for supplying power to the electric motor, in particular a stator of the electric motor. The power semiconductor has a thermal contact area for dissipating heat, and the housing has a mating contact area which corresponds to the thermal contact area.

In the method, the thermal contact area makes operative contact with the mating contact area in the direction of a motor shaft longitudinal axis when the power semiconductor is joined to the housing. Heat can be dissipated from the power semiconductor to the housing as a result. By virtue of arranging the mating contact area on the housing, the electronics assembly can advantageously be connected to the housing of the electric motor in only a few assembly steps.

BRIEF DESCRIPTION OF THE DRAWINGS

The invention will now be explained below with reference to figures and further exemplary embodiments. Further advantageous embodiments can be gathered from the features in the figures and from the features of the dependent claims.

DETAILED DESCRIPTION

Figure 1:
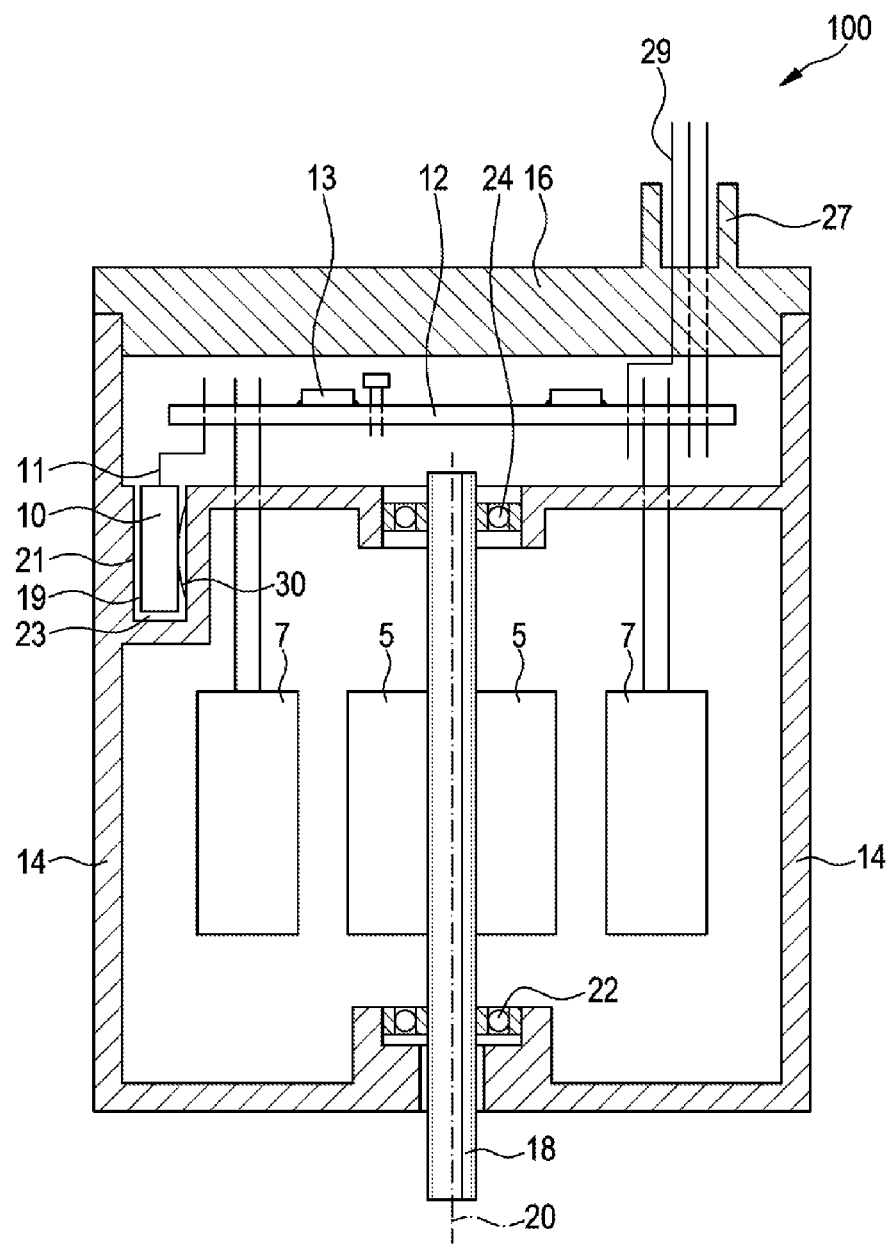
FIG. 1 shows an exemplary embodiment of an electric motor.

FIG. 1—schematically—shows an exemplary embodiment of an electric motor 1. The electric motor 1 has a rotor 5, a stator 7 comprising, for example, three stator coils, and a power output stage having at least one power semiconductor. The power semiconductor 10 is illustrated by way of example in the longitudinal section of the electric motor 1 which is illustrated in FIG. 1. The electric motor 1 also has a printed circuit board 12 which is connected to electronic components, the electronic component 13 of said electronic components being denoted by way of example. The printed circuit board 12 is also connected to the stator 7, and there to stator coils of the stator 7, in this exemplary embodiment.

The power semiconductor 10 has electrical connections, the electrical connection 11 of said electrical connections being denoted by way of example. The electric motor 1 has a housing having a housing cup 14. The housing cup surrounds a hollow space which is designed to accommodate the stator 7, the rotor 5, the printed circuit board 12 and the power semiconductor 10. The electric motor 1 also has a housing cover 16 which is designed to close the hollow space which is surrounded by the housing cup 14. The electric motor 1 also has a motor shaft 18 which is connected to the rotor 5 in a rotationally fixed manner. The motor shaft 18 is mounted by means of an output drive-end motor bearing 22 and a further motor shaft bearing 24 such that it can be rotated about a motor shaft longitudinal axis 20.

The power semiconductor 10 has a thermal contact area 19 which makes operative contact with a mating contact area 21 of the housing cup 14—after the power semiconductor 10 has been inserted into a hollow space or shaft 23 in the housing cup 14, which hollow space or shaft is designed to accommodate the power semiconductor 10.

The housing cup 14 of the electric motor 1 also has a leaf spring 30 which extends at least partially into the shaft 23 and which is arranged and designed—in a manner supported on a shaft wall of the shaft 23—to press the power semiconductor 10 against the housing cup 14, and there against the mating contact area 21, by way of its thermal contact area 19.

The motor shaft bearing 24 is held by a web 17, wherein the web 17 extends radially inward in the direction of the motor shaft longitudinal axis 20 from a wall of the housing cup 14.

The housing cover 16 which is illustrated in FIG. 1 has, for example, a bushing 27 which is integrally formed on said housing cover and has electrical contacts for establishing an electrical connection with the electric motor 1. The contact 29 from amongst the electrical contacts for establishing a connection with the electric motor is denoted by way of example.

Figure 2:
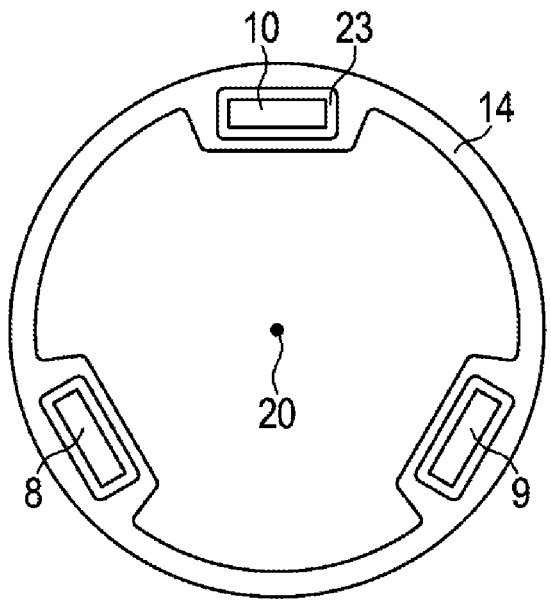
FIG. 2 shows a cross section through the electric motor which is illustrated in FIG. 1.

FIG. 2—schematically—shows a cross section through the electric motor 1 which is illustrated in FIG. 1. Said figure shows the housing cup 14, which has a hollow space, in particular a shaft for the power semiconductors 10 which are illustrated by way of example in FIG. 1 and for two further power semiconductors 8 and 9, wherein the shaft 23 for the power semiconductor 10 is denoted by way of example. Said figure also shows the motor shaft longitudinal axis 20 which, in FIG. 2, runs transverse to the sectional plane of the cross section shown in FIG. 2.

Figure 3:
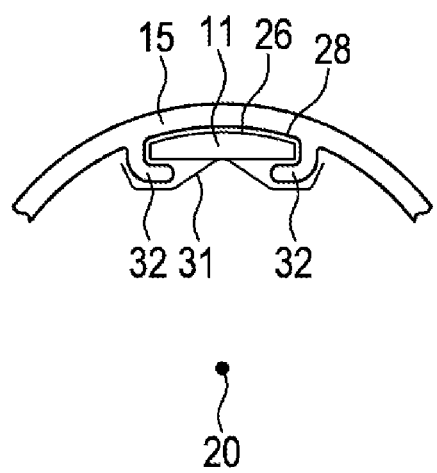
FIG. 3 shows an exemplary embodiment of a housing cup of an electric motor, a section of said housing cup being illustrated.

FIG. 3—schematically—shows an exemplary embodiment of a housing cup 15 of an electric motor. In contrast to the housing cup 14 which is illustrated in FIGS. 1 and 2—the housing cup 15 has a mating contact area 28 which is concavely curved and runs so as to correspond to a convexly curved thermal contact area 26 of a power semiconductor 11. In the cross-sectional illustration which is shown in FIG. 3 of the housing cup 15, of which a section of the circumference is shown, the motor shaft longitudinal axis 20 runs transverse to the sectional plane of the sectional illustration which is shown in FIG. 3. In the exemplary embodiment which is shown in FIG. 3, the housing cup 15 has two hooks or rails 32 which are integrally formed on the housing cup 15 and which are each designed to engage behind the power semiconductor 11 in an at least partially interlocking manner and to hold or to press the thermal contact area 26 of the power semiconductor 11 against the mating contact area 28 of the housing cup 15.

In order to press the power semiconductor 11 against the housing cup 15, the housing cup 15 can, for example, have a leaf spring 31 which is designed and arranged to press the power semiconductor 11 against the mating contact area 28 of the housing cup 15 by way of its thermal contact area 26.

Figure 4:
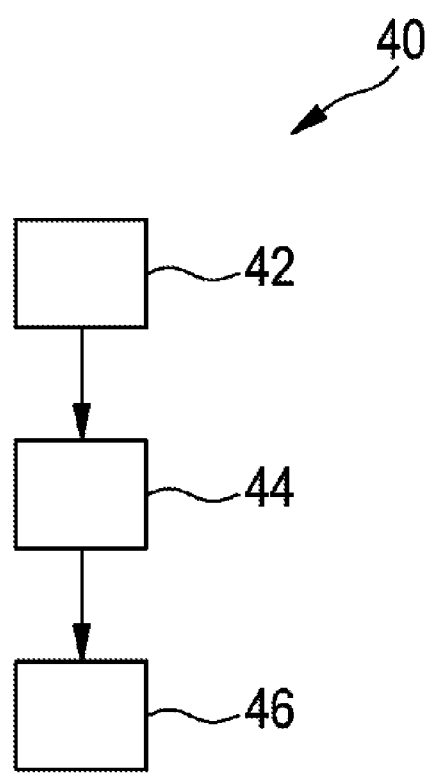
FIG. 4 shows an exemplary embodiment of a method for producing an electric motor.

FIG. 4 shows an exemplary embodiment of a method for connecting an electronics assembly of an electric motor to a cup-shaped housing part, in particular a housing cup of a housing of the electric motor. The electronics assembly of the electric motor has at least one power semiconductor for supplying power to the electric motor, in particular to a stator of the electric motor. The power semiconductor has a thermal contact area for dissipating heat, and the housing part has a mating contact area which corresponds to the thermal contact area.

In step 42 of the method, the thermal contact area makes operative contact with the mating contact area in the direction of a motor shaft longitudinal axis when the power semiconductor is joined to the housing part. Heat can be dissipated from the power semiconductor to the housing part as a result.

In a further step 44, an electronics assembly, in particular a printed circuit board, is electrically connected to the power semiconductor, for example by soldering connections of the power semiconductor to the electronics assembly, in particular the printed circuit board.

In a further step 46, a housing cover is connected to the housing part, in particular to a housing cup which surrounds a hollow space, with the result that the at least one power semiconductor, the electronics assembly, a rotor and a stator of the electric motor are contained in the hollow space.

The electronics assembly can advantageously be connected to the housing of the electric motor in only a few assembly steps by virtue of the mating contact area being arranged on the housing.

What is claimed is:

1. An electric motor (1), having a stator (7), a rotor (5), and a housing (14, 16) which accommodates at least the rotor (5) and the stator (7) in a hollow space, wherein the electric motor (1) has a power output stage (8, 9, 10, 11) which is connected to the stator (7) and is designed to supply power to the stator (7) in order to generate a rotating magnetic field, wherein the power output stage has at least one power semiconductor (8, 9, 10, 11) with a thermal contact area (19, 26), wherein the thermal contact area (19, 26) is connected to the housing (14) so as to conduct heat, with the result that heat which is generated in the power semiconductor (8, 9, 10, 11) can be dissipated to the housing (14), characterized in that the housing (14, 16) has a housing cover (16), and a thermally conductive housing cup (14) coupled to the housing cover (16), the housing cup (14) at least partially surrounds the hollow space, wherein a motor shaft (18) extends out of the housing cup (14) only at an end of the housing (14, 16) opposite the housing cover (16), wherein the housing cup (14) has a cup wall which has a mating contact area (21, 28) which corresponds to the thermal contact area (19, 26), wherein the housing cup (14) further has a guide element (23, 32) in a region of the mating contact area (21, 28), wherein the guide element (23, 32) guides the power semiconductor (8, 9, 10, 11) when the power semiconductor (8, 9, 10, 11) is joined to the housing cup (14), wherein the guide element (23, 32) establishes operative contact between the thermal contact area (19, 26) and the mating contact area (21, 28), wherein the hollow space is a first hollow space, wherein the guide element (23, 32) includes a guide element wall that defines at least one second hollow space to receive the at least one power semiconductor (8, 9, 10, 11), and wherein the guide element wall includes a hook or rail.

2. The electric motor (1) as claimed in claim 1, characterized in that the power semiconductor (8, 9, 10, 11) is connected to a printed circuit board (12) which is arranged in the hollow space, a plane of said printed circuit board extending transverse to a motor shaft longitudinal axis (20) of the electric motor (1), and the power semiconductor (8, 9, 10, 11) being arranged in such a way that the thermal contact area (19, 26) makes operative contact with the mating contact area (21, 28) along the motor shaft longitudinal axis (20) when the power semiconductor (8, 9, 10, 11) is assembled.

3. The electric motor (1) as claimed in claim 2, characterized in that the power semiconductor (8, 9, 10, 11) is spaced apart from the printed circuit board (12) in such a way that, during operation of the electric motor (1), more heat is dissipated via the mating contact area (21, 28) than is introduced into the printed circuit board (12).

4. The electric motor (1) as claimed in claim 1, characterized in that the thermal contact area (26) is convexly curved, and the mating contact area (28) is concavely curved so as to correspond to the thermal contact area (26).

5. The electric motor (1) as claimed in claim 1, characterized in that the thermal contact area (19) and the mating contact area (21) are each flat.

6. The electric motor (1) as claimed in claim 1, characterized in that the electric motor (1) has a predetermined number of stator coils and the cup wall of the housing cup (14) has the predetermined number of mating contact areas (21, 28) in a rotor circumferential direction.

7. The electric motor (1) as claimed in claim 1, characterized in that the guide element (23, 32, 30, 31) is designed to press the power semiconductor against the mating contact area during assembly and thereby to generate the operative contact.

8. A method (40) for connecting an electronics assembly (12, 13) to the electric motor of claim 1, wherein the electronics assembly includes the at least one power semiconductor (8, 9, 10, 11), comprising causing the thermal contact area (19, 26) to make operative contact with the mating contact area (21, 28) in the direction of a motor shaft longitudinal axis (20) when the power semiconductor (8, 9, 10,11) is joined to the housing (14, 15).

9. The electric motor (1) as claimed in claim 1, characterized in that the power semiconductor (8, 9, 10, 11) is connected by way of connections of the power semiconductor (8, 9, 10, 11) to a printed circuit board (12) which is arranged in the hollow space, a plane of said printed circuit board extending transverse to a motor shaft longitudinal axis (20) of the electric motor (1), and the power semiconductor (8, 9, 10, 11) being arranged in such a way that the thermal contact area (19, 26) makes operative contact with the mating contact area (21, 28) along the motor shaft longitudinal axis (20) when the power semiconductor (8, 9, 10, 11) is assembled.

10. The electric motor (1) as claimed in claim 1, characterized in that the stator has a predetermined number of stator coils and the cup wall of the housing cup (14) has the predetermined number of mating contact areas (21, 28) in a rotor circumferential direction.

11. The electric motor (1) as claimed in claim 1, wherein the power output stage includes a plurality of power semiconductors (8, 9, 10, 11) arranged circumferentially about the electric motor (1), and wherein the housing cup (14) includes a plurality of guide elements (23, 32) that receive the power semiconductors (8, 9, 10, 11).

12. The electric motor (1) as claimed in claim 1, wherein the guide element (23, 32) includes a spring (30, 31) that biases the power semiconductor (8, 9, 10, 11) against the cup wall of the housing cup (14).

13. The electric motor (1) as claimed in claim 1, wherein the power semiconductor (8, 9, 10, 11) is connected to a printed circuit board (12) which is arranged in the hollow space, and wherein the printed circuit board (12) is disposed axially between the guide element (23, 32) and the housing cover (16).

14. The electric motor (1) as claimed in claim 13, wherein the printed circuit board (12) is spaced axially from both the guide element (23, 32) and the housing cover (16).

15. The electric motor (1) as claimed in claim 13, wherein an electrical contact (29) extends through the housing cover (16) to the printed circuit board (12).

16. The electric motor (1) as claimed in claim 1, wherein the power semiconductor (8, 9, 10, 11) is connected to a printed circuit board (12) which is arranged in the hollow space, and wherein the printed circuit board (12) is disposed axially between the motor shaft (18) and the housing cover (16).

17. The electric motor (1) as claimed in claim 1, wherein the housing cup (14) includes a bottom wall and an integrally formed side wall extending upwardly from the bottom wall, wherein the side wall at least partially surrounds the hollow space.

18. An electric motor (1), having a stator (7), a rotor (5), and a housing (14, 16) which accommodates at least the rotor (5) and the stator (7) in a hollow space, wherein the electric motor (1) has a power output stage (8, 9, 10, 11) which is connected to the stator (7) and is designed to supply power to the stator (7) in order to generate a rotating magnetic field, wherein the power output stage has at least one power semiconductor (8, 9, 10, 11) with a thermal contact area (19, 26), wherein the thermal contact area (19, 26) is connected to the housing (14) so as to conduct heat, with the result that heat which is generated in the power semiconductor (8, 9, 10, 11) can be dissipated to the housing (14), wherein the housing (14, 16) has a housing cover (16), and a thermally conductive housing cup (14) coupled to the housing cover (16), the housing cup (14) at least partially surrounds the hollow space, wherein a motor shaft (18) extends out of the housing cup (14) at an end of the housing (14, 16) opposite the housing cover (16), wherein the housing cup (14) has a cup wall which has a mating contact area (21, 28) which corresponds to the thermal contact area (19, 26), wherein the housing cup (14) further has a guide element (23, 32) in a region of the mating contact area (21, 28), wherein the guide element guides the power semiconductor (8, 9, 10, 11) when the power semiconductor (8, 9, 10, 11) is joined to the housing cup (14), wherein the guide element (23, 32) establishes operative contact between the thermal contact area (19, 26) and the mating contact area (21, 28), wherein the hollow space is a first hollow space, and wherein the guide element (23, 32) includes a guide element wall that defines at least one second hollow space to receive the at least one power semiconductor (8, 9, 10, 11), the guide element wall including a hook.

19. An electric motor (1), having a stator (7), a rotor (5), and a housing (14, 16) which accommodates at least the rotor (5) and the stator (7) in a hollow space, wherein the electric motor (1) has a power output stage (8, 9, 10, 11) which is connected to the stator (7) and is designed to supply power to the stator (7) in order to generate a rotating magnetic field, wherein the power output stage has at least one power semiconductor (8, 9, 10, 11) with a thermal contact area (19, 26), wherein the thermal contact area (19, 26) is connected to the housing (14) so as to conduct heat, with the result that heat which is generated in the power semiconductor (8, 9, 10, 11) can be dissipated to the housing (14), wherein the housing (14, 16) has a housing cover (16), and a thermally conductive housing cup (14) coupled to the housing cover (16), the housing cup (14) at least partially surrounds the hollow space, wherein a motor shaft (18) extends out of the housing cup (14) at an end of the housing (14, 16) opposite the housing cover (16), wherein the housing cup (14) has a cup wall which has a mating contact area (21, 28) which corresponds to the thermal contact area (19, 26), wherein the housing cup (14) further has a guide element (23, 32) in a region of the mating contact area (21, 28), wherein the guide element guides the power semiconductor (8, 9, 10, 11) when the power semiconductor (8, 9, 10, 11) is joined to the housing cup (14), wherein the guide element (23, 32) establishes operative contact between the thermal contact area (19, 26) and the mating contact area (21, 28), wherein the hollow space is a first hollow space, and wherein the guide element (23, 32) includes a guide element wall that defines at least one second hollow space to receive the at least one power semiconductor (8, 9, 10, 11), the guide element wall including a rail.

\* \* \* \* \*